No. 791,246. PATENTED MAY 30, 1905.
G. H. CATT.
CIGAR MAKING MACHINE.
APPLICATION FILED JAN. 12, 1904.
2 SHEETS—SHEET 2.
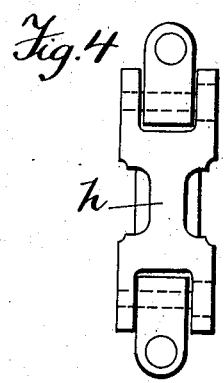
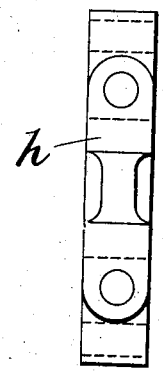
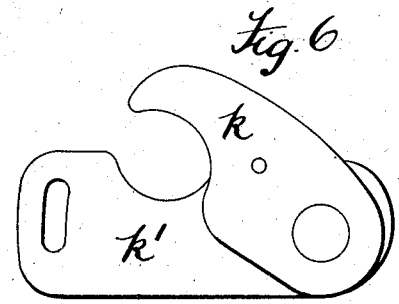
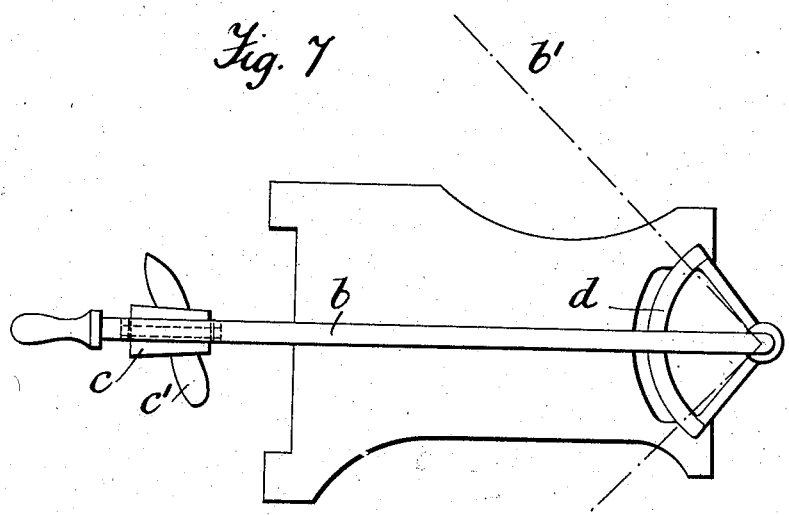
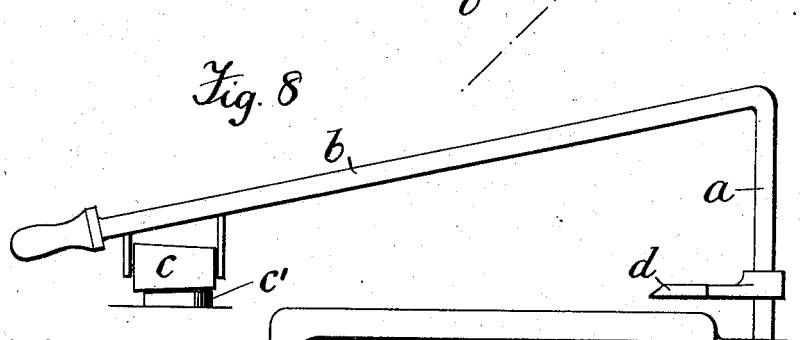

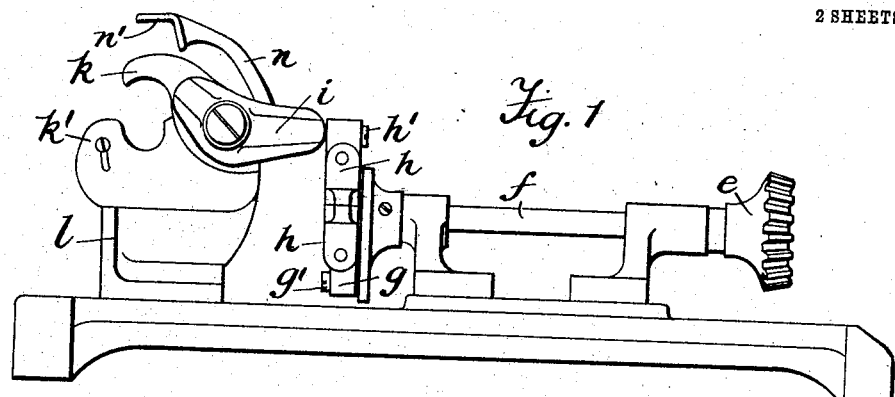
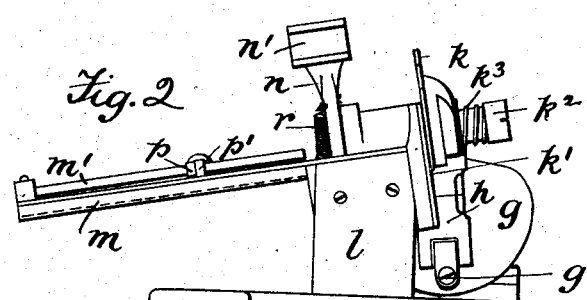
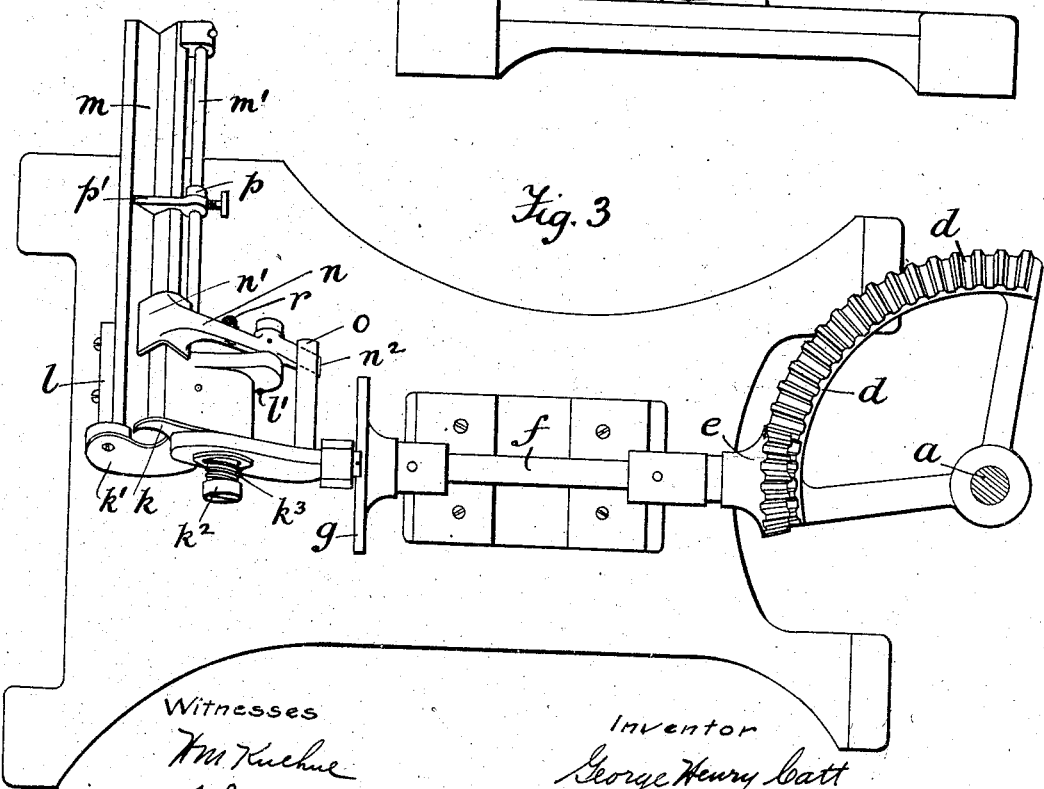

No. 791,246.

Patented May 30, 1905.

UNITED STATES PATENT OFFICE.

GEORGE HENRY CATT, OF HYTHE, ENGLAND.

CIGAR-MAKING MACHINE.

SPECIFICATION forming part of Letters Patent No. 791,246, dated May 30, 1905.

Application filed January 12, 1904. Serial No. 188,777.

*To all whom it may concern:*

Be it known that I, GEORGE HENRY CATT, justice of the peace, a subject of the King of England, and a resident of Villa Amalthea, Hythe, in the county of Southampton, England, have invented a certain new and useful Improvement in Cigar-Making Machines, of which the following is a full, clear, and exact description, and for which I have applied for Letters Patent in Great Britain, No. 2,860, dated February 6, 1903.

This invention relates to certain improvements in machines used in the manufacture of cigars; and it consists of the construction, arrangement, and combination of parts hereinafter described, and particularly pointed out in the claims.

Referring to the accompanying drawings, which illustrate a machine made according to my invention, Figure 1 is a side elevation of the tuck-cutting device, the operating mechanism being removed. Fig. 2 is an end view of Fig. 1. Fig. 3 is a plan of Fig. 1 with a part of the operating mechanism added. Figs. 4 and 5 are front and side views, on a larger scale, of a suitable universal joint between the crank-shaft and the tuck-cutting knives. Fig. 6 is an elevation, also on a large scale, of the tuck-cutting knives. Figs. 7 and 8 are respectively plan and elevation of the operating-lever, showing its connection to the machine and showing also a means for cutting out the wrapper of the cigar.

Upon an axis $a$, which may be vertical, as shown, is rigidly mounted a hand-lever $b$, capable of being swung horizontally from side to side. The outer end of this lever is provided with a pressure-roller $c$ or other means for acting on or engaging a die $c'$. Any ordinary method of cutting out the wrapper-leaves by means of a die and roller may be used, the lever being provided with means for performing this operation at each sidewise stroke. The roller $c$ is preferably conical in shape, with its narrower diameter toward the pivot-axis $a$, and may be journaled in hangers dependent from the hand-lever $b$. The die is secured immediately below the roller $c$, so that a leaf laid on the die is pressed thereon and cut to the shape of the die by the roller $c$ as it passes along the latter. The axis is provided with a toothed quadrant or segment $d$, capable of engaging a bevel-pinion $e$, secured upon a shaft $f$. The horizontal hand-lever during its stroke in either direction rotates the bevel-wheel and its shaft in one direction or the other through the axis $a$.

The reversely-rotatable shaft $f$ is mounted in suitable bearings upon the machine, and its other extremity is provided with a crank-arm $g$. The crank $g$ is secured to the tuck-cutting knives by suitable articulated connections. Thus to the outer end of this crank-arm $g$ is fitted, by means of a screw or pivot $g'$, a double-jointed (or universally-jointed) shaft $h$. The other end of this shaft by means of a screw or pivot $h'$ is pivoted to a tilting lever $i$, capable of actuating a tuck-cutting knife $k$. Preferably this lever $i$ is at its forward end secured to or formed with the knife $k$, fulcrumed upon a support or frame $l$, upstanding from the bed-plate of the machine, so that the knife $k$ moves integrally with the lever $i$. The jointed shaft $h$ thus forms a connecting-rod between the crank-shaft $g$ and the tilting lever $i$.

The frame $l$ is provided with a cradle or grooved bed $m$ for holding the cigar. This cradle is preferably inclined from the horizontal, as shown in Fig. 2, and the fulcrumed knife $k$ is fitted at the upper end of this inclined cradle, being adapted to coöperate with a fixed knife $k'$, secured to the cradle $m$. The fulcrum for the knife-lever $k$ may consist, as shown, of a bolt $k^2$ extending outward of the frame $l$ and furnished with a helical spring $k^3$, mounted on the bolt and bearing against a washer on the same, so that the knife $k$ is kept in its proper position against the fixed knife $k'$. Rearward of this frame $l$ is a lug $l'$, wherein is pivoted a lever $n$, fitted with a grooved clamp $n'$, adapted to approach the cradle and to bear on a cigar lying therein. The other arm $n^2$ of this lever is smaller and is capable of being engaged by a striker-rod or roller-fitted arm $o$, (see Fig. 3,) projecting from the rear of the knife-lever $i$. This clamp-lever $n$ is impelled forward either by means of a coiled spring upon its fulcrum or by means of a tensioning-spring $r$. This spring $r$ is shown secured at one end to the support $l$ and at the other to the forward arm of said lever, so that normally the clamp is upon the cradle. When, however, this striker-arm $o$ meets and bears upon the smaller arm $n^2$ of the clamp-lever $n$, it lifts the clamp $n'$.

The cradle $m$ is fitted with an adjustable stop for determining the length of the cigar. This stop may be arranged on a rod $m'$, mounted parallel to the inclined cradle, and Fig. 3 shows a stop $p$ on rod $m'$, having a portion $p'$ traveling in the cradle. This stop can be fixed in the desired position by a set-screw, as shown, or otherwise. The head of the cigar bears against the adjustable stop in the cradle, so that the length of the finished cigar from head to tuck is always the same.

A cigar having been placed in the cradle $m$, the striker-arm $o$ from the knife-lever $i$ rises by the movement of crank-arm $g$ and allows the spring to push forward the clamp, and after the clamp has closed on the cigar the movable knife $k$ by the continued movement of the crank-arm $g$ cuts off or trims the tuck end. Arm $n^2$ being shorter than arm $n$ and the clamp-arm and tuck-cutting knife (with its lever) being pivoted in different vertical planes, the clamp $n'$ moves forward and closes on the cigar before the knife reaches its cutting position. By means of the special connecting-rod $h$ from the crank-shaft rotation of the bevel-wheel shaft $f$ in either direction causes this descent of the clamp $n'$, followed by the cutting operation of the knife $k$. After the knife has performed its work the continued rotation of the bevel-pinion shaft raises the knife and clamp.

The toothed segment $d$, secured to the swinging horizontal hand-lever $b$, is so proportioned that one stroke of the said lever causes a full revolution of the bevel-pinion $e$ and its shaft $f$. The hand-lever $b$, Fig. 7, is shown in a central position, the roller $c$ being at about the middle of the length of the die $c'$. It will thus be seen that at each stroke of the swinging hand-lever, as shown in dotted lines $b'$ and $b^2$, Fig. 7, the bevel-pinion is rotated and the clamp and knife are actuated, these parts passing from the raised position to the lowered position and back to the raised position.

In working the operator first cuts the wrapper-leaf on the die, which after suitable and ordinary treatment is wrapped about the bunch of the cigar. The cigar is then placed in the cradle $m$, the head abutting against the stop $p'$, and a second leaf is placed on the die $c'$. Upon swinging over the hand-lever from $b'$ to $b^2$ (or $b^2$ to $b'$) this second wrapper-leaf is cut out and the tuck end cut from the previously-made cigar, both operations being performed by the same movement of the hand-lever.

Means may be provided for the adjustment of the knife-blades and the clamp, and, if desired, both knife-blades may be arranged to close together, as is sometimes usual in tuck-cutting knives.

Having thus described my invention, what I claim as such, and desire to secure by Letters Patent, is—

1. A machine for use in the manufacture of cigars, comprising a hand-lever adapted to have horizontal movement, a vertically-oscillating knife and geared connections between the knife and lever whereby the knife is oscillated on the horizontal movement of the lever, substantially as described.

2. A machine for use in the manufacture of cigars comprising a lever adapted to have horizontal oscillating movement, a knife adapted to have vertically-oscillating movement and geared connections between the knife and lever whereby the knife will be operated by the movement of the lever.

3. A machine for use in the manufacture of cigars, comprising a pivoted hand-lever having horizontal movement, tuck-cutting knives, a cradle-support on which said knives are supported and a geared connection between said hand-lever and one of said tuck-cutting knives.

4. A machine for use in the manufacture of cigars, comprising a pivoted hand-lever, said lever being movable horizontally, a reversely-rotatable shaft connections from said hand-lever to said shaft so that the shaft will be rotated when the lever is moved, tuck-cutting knives mounted in axial prolongation of the said reversible shaft, and connections from the shaft to one of the cutting-knives whereby said shaft by its rotation effects the closing movement of said knives.

5. A machine for use in the manufacture of cigars, comprising a pivoted hand-lever, said lever being movable horizontally in either direction, a reversely-rotatable shaft connections from said hand-lever to said shaft so that the shaft will be rotated when the lever is moved, tuck-cutting knives mounted upon a cradle, a crank-arm to said shaft and a double-jointed connection between one of the cutting-knives and said crank-arm, so that a stroke of the hand-lever in either direction will close the tuck-cutting knives.

6. A machine for use in the manufacture of cigars, comprising a pivoted hand-lever, tuck-cutting knives, a cradle-support on which said knives are supported, a clamp-arm pivoted upon said support, and connections between said hand-lever, one of said knives and clamp-arm for throwing said knife and said clamp-arm into action on moving said hand-lever.

7. A machine for use in the manufacture of cigars, comprising a vertically-pivoted hand-lever, a horizontal reversely-rotatable shaft, connections from said hand-lever to said shaft so that the shaft will be rotated when the lever is moved, a crank-arm to said shaft, a cradle-support, said cradle being adapted to receive a wrapped cigar, tuck-cutting knives mounted upon said support, a spring-impelled clamp-arm pivoted upon said support, articulated connections between said crank-arm and one of said tuck-cutting knives, and means whereby said clamp-arm moves forward before this tuck-cutting knife reaches its cutting position.

8. A machine for use in the manufacture of cigars, comprising a pivoted hand-lever, a rotatable shaft having connections at one end to said hand-lever, a crank-arm upon the other end of said shaft, a cradle-support to one side of the axis of said shaft, said cradle being adapted to contain a wrapped cigar, tuck-cutting knives mounted upon one end of said cradle-support, a tilting lever mounted on the pivot of said knives and adapted to engage and push forward one of said knives, a double-jointed connection between said crank-arm and said tilting lever, a spring-impelled lever-arm pivoted upon said support, said lever-arm having a clamp adapted to bear upon the wrapped cigar in the cradle, and a striker-rod projecting sidewise from the tilting lever which is connected to the crank-arm, said striker-rod bearing on the lever-arm and acting against its spring so as to keep it raised until the proper time.

9. A machine for use in the manufacture of cigars, comprising a pivoted hand-lever, a cradle-support, a movable tuck-cutting knife mounted thereon, a spring-impelled clamp-arm also mounted on the support a reversely-rotating shaft having geared connections to said hand-lever and provided with means for both actuating the movable tuck-cutting knife and releasing the spring-impelled clamp-arm, said cradle-support being inclined from the horizontal and adapted to hold a wrapped cigar, a rod parallel with said cradle, and a stop adjustable upon said rod and having a portion projecting into the cradle.

10. A machine for use in the manufacture of cigars, comprising a sidewise-movable operating-lever a vertical axis connected to said lever, a rotatable shaft mounted on the machine, a crank to said shaft, a movable tuck-cutting knife articulated connections between said crank and the movable tuck-cutting knife, a cradle-support on which said knife is pivoted, a lever-arm also mounted on said support, said lever having a clamp at one end said lever having a spring for normally pressing its clamped end downwardly, a striker-rod outstanding from said movable knife engaging the other end of said clamp-lever, a bevel-pinion secured to the inner end of said rotatable shaft and a toothed quadrant secured to the vertical axis, said quadrant engaging the bevel-pinion and rotating the reversible shaft in either direction.

In witness whereof I have hereunto set my hand in presence of two witnesses.

GEORGE HENRY CATT.

Witnesses:
JOSEPH W. HOPLEY,
CHARLES PACK.